United States Patent

[11] 3,577,987

| [72] | Inventor | Paul H. Bronnenkant |
| | | Williamsville, N.Y. |
| [21] | Appl. No. | 680,692 |
| [22] | Filed | Nov. 6, 1967 |
| [45] | Patented | May 11, 1971 |
| [73] | Assignee | Hallmark Plastics, Inc. |
| | | Buffalo, N.Y. |

[54] ARTICLE HAVING AN INTEGRAL ELONGATED APPENDAGE, AND METHOD OF MANUFACTURING THE SAME
8 Claims, 12 Drawing Figs.

[52] U.S. Cl. ................................................ 128/130, 161/402, 264/291
[51] Int. Cl. .................................................. A61f 5/46
[50] Field of Search ........................................ 128/130; 264/291, 290; 18/5, 30, 42; 161/402

[56]           References Cited
           UNITED STATES PATENTS
| 3,380,122 | 4/1968 | Kirk | 264/291 |
| 3,382,869 | 5/1968 | Rigney et al. | 128/130 |
| 3,144,430 | 8/1964 | Schaffhausen | 264/291X |
| 3,233,019 | 2/1966 | Adams | 264/290N |
| 3,359,983 | 12/1967 | Northey | 128/335.5 |

FOREIGN PATENTS
| 1,080,577 | 8/1967 | Great Britain | 128/130 |

OTHER REFERENCES
" Intra-Uterine Contraceptive Devices," EXCERPTA MEDICA FOUNDATION, pp. 61— 64 (Sept. 1965 rec' d in patent office) (copy in 128— 130)

Primary Examiner—Charles F. Rosenbaum
Attorney—Sommer, Weber & Gastel

ABSTRACT: An article is manufactured by molding of a polyolefin material a body portion from which extends an integral elongated appendage portion that is subsequently stretched to increase its length, reduce its cross-sectional area and increase its unit tensile strength.

PATENTED MAY 11 1971   3,577,987
INVENTOR.
Paul H. Bronnenkant
BY
Popp and Sommer
ATTORNEYS
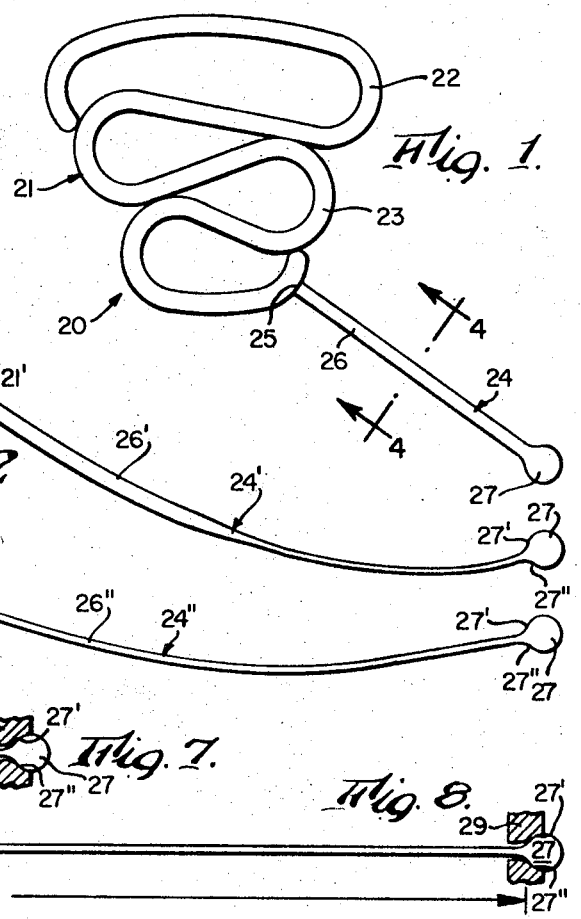
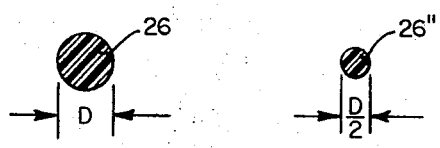
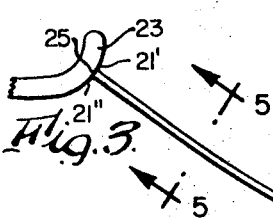
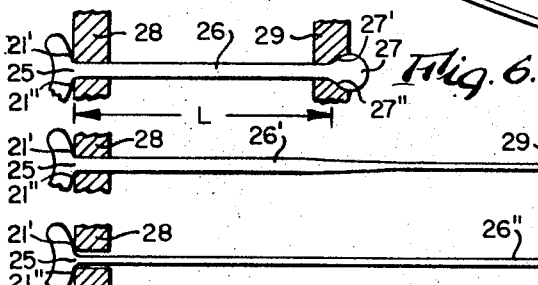
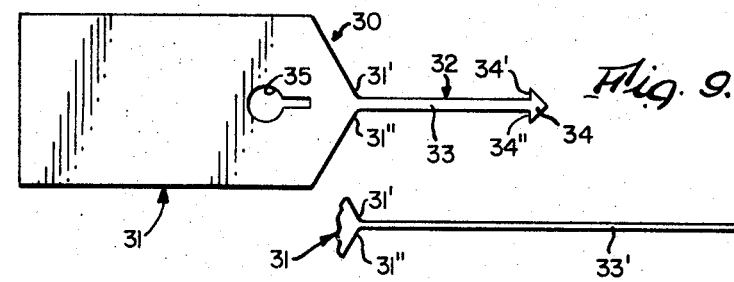
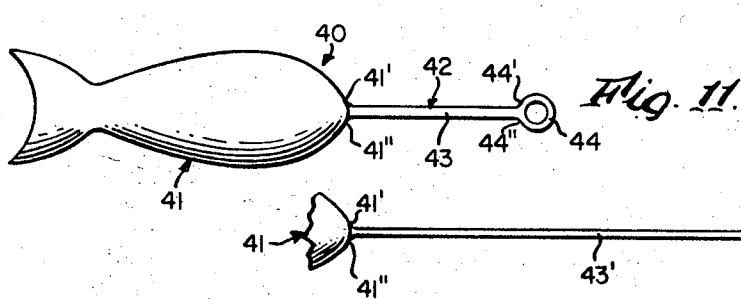

3,577,987

ARTICLE HAVING AN INTEGRAL ELONGATED APPENDAGE, AND METHOD OF MANUFACTURING THE SAME

BACKGROUND OF THE INVENTION

Heretofore it has been difficult if not impossible to mold repeatably as by injection molding a thermoplastic article which includes a relatively thin and long appendage which extends from the main body of the molded article. Because of the relatively small cross-sectional size of the appendage it was difficult to flow the plastic material into the corresponding section of the mold. Sometimes a chilling of the mold would cause a blockage in the appendage forming section of the mold so that resulting articles were not fully formed as desired. This was not only not conducive to quantity production, but was wasteful of time and materials since incompletely molded articles had to be scraped at least to the extent of possibly being reground for reuse of the thermoplastic material.

Sometimes an article which required a thin appendage to extend therefrom was manufactured by fastening a separate element to the main part of the article. For example, in U.S. Pat. No. 3,250,271, there is shown a molded intrauterine device, known as the Lippes Loop, which includes a main serpentine body portion from which extends a threadlike element which is attached to the body portion by passing a length of the threadlike element through a hole in the body portion near one end thereof and thereafter tying a knot in it to provide a two strand tail. This tail application was usually performed as a manual operation, obviously a time-consuming technique which reduced the production rate of such devices and contributed relatively substantially to their cost.

SUMMARY OF THE INVENTION

The primary object of the present invention is to obviate the aforementioned difficulties by producing an article having an integral elongated tail. This is accomplished by molding of a polyolefin material having a principally crystalline structure the article which includes a body portion of the desired shape and an integral elongated appendage portion, and then stretching the appendage portion to increase its length, decrease its cross-sectional area and increase its unit tensile strength so as to provide a strong, thin and relatively long tail.

BRIEF DESCRIPTION OF THE DRAWING

FIG. 1 is a side elevational view of a Lippes Loop type of intrauterine device after it is molded in accordance with the present invention.

FIG. 2 is a fragmentary similar view of the appendage portion of the device shown in FIG. 1 but after such portion has been partially stretched.

FIG. 3 is a view similar to FIG. 2 but showing the appendage portion after it has been fully stretched.

FIG. 4 is an enlarged cross-sectional view of the appendage portion as initially molded, this view being taken on line 4—4 of FIG. 1.

FIG. 5 is an enlarged cross-sectional view of the appendage portion after it has been fully stretched, this view being taken on line 5—5 of FIG. 3.

FIGS. 6 through 8 represent a sequence of stretching steps in which supports are provided at opposite ends of the appendage portion, FIG. 6 depicting such portion before any stretching, FIG. 7 depicting such portion after partial stretching, and FIG. 8 depicting such portion after having been fully stretched.

FIG. 9 is a side elevational view of another device produced according to the present invention, the device shown being a tag with an integral appendage portion before the latter is stretched.

FIG. 10 is a fragmentary view similar to FIG. 9 but showing the appendage portion after it has been stretched so that it may be used as a tie to be lopped back upon itself and its free end secured to the main body of the tag.

FIG. 11 is a side elevational view of still another device produced according to the present invention, the device shown being a fishing lure with an integral appendage portion before the latter is stretched.

FIG. 12 is a fragmentary view similar to FIG. 11 but showing the appendage portion after it has been stretched so that it may serve as a leader for the lure.

DESCRIPTION OF THE PREFERRED EMBODIMENTS FIGURES 1—8

Referring to FIG. 1, the numeral 20 represents generally an intrauterine device of the Lippes Loop type after the same has been molded in accordance with the present invention. The device comprises a barlike body portion 21 curved in a substantially flat plane in the shape of a large S part 22 continuing into a smaller S part 23 and an integral appendage portion 24 which at one end extends laterally from the free end portion of the smaller S part as indicated at 25. The appendage portion 24 is shown as initially molded to have an elongated part 26 with an integral enlarged head at its free end, such head being shown as a generally spherical ball 27.

It is preferred to produce the article shown in FIG. 1 by injecting a suitable thermoplastic material in a mold having the appropriate cavity configuration. Such mold and molding apparatus form no part of the present invention hence have not been illustrated, besides being of a type well known to those skilled in the plastics molding art.

After device 20 has been so molded a support 28 is placed against part 23 of body portion 21, bearing against the shoulder surfaces 21' and 21" thereof on opposite sides of the elongated part 26 of appendage portion 24. Another and similar support 29 is placed against the shoulder surfaces 27' and 27" of ball part 27 on opposite sides of elongated part 26 where it connects with this ball part.

Thereafter supports 28 and 29 are moved apart, manually or by machinery (not shown) at a slow enough rate such that the plastic material of the elongated part 26 of appendage portion 24 is allowed to flow without tearing or breading. During the stretching of this elongated part it gradually reduces in thickness from some point intermediate its ends, such partially elongated part being indicated at 26' in FIGS. 2 and 7.

Stretching of part 26' continues preferably until it assumes a substantially uniform thickness throughout its new and greater length, this fully stretched part being indicated at 26" in FIGS. 3 and 8.

The elongated part 26 before stretching is shown in FIG. 4 as having a substantially circular cross section having a diameter D. This elongated part 26 in stretching from its original length L shown in FIG. 6 will further elongate to about four times its original length, or 4L as shown in FIG. 8. During this elongation the diameter D will reduce to about half, or D/2 as shown in FIG. 5. Also, the generally circular cross-sectional shape of part 26 will be retained during its elongation and reduction in cross-sectional area.

For example, the appendage part 26 of a device 20 having an initial length of fifteen-sixteenths inch and a nominal diameter of 0.040 inch molded of a polypropylene or a propylene copolymer or a mixture of propylene copolymer and ethyl vinyl acetate, was stretched to a final length of 3½ to 4 inches and has a diameter of 0.020 inch.

It has been found that once the new and reduced transverse size has been achieved throughout the full length of stretched part 26", any further force applied to separate supports 28 and 29 sufficient to move them farther apart will break part 26". Accordingly, the stretching force is discontinued when the reduction in transverse size has been achieved for the full length of part 26".

It has also been found that the unit tensile strength or yield point of the fully stretched elongated part 26" is very much greater than that of initial part 26, such as about at least eight times as great.

The thermoplastic material suitable to produce a device in accordance with the present invention must be a polyolefin having a principally crystalline structure. Successful results have been achieved with polypropylene, propylene copolymer, and a mixture of propylene copolymer and ethyl vinyl acetate, each of which have a principally crystalline structure. In general, the more the molding material has a crystalline structure the easier it is to stretch. Polyolefins having a principally amorphous structure are not operative in the practice of the present invention.

Suitable additives can be combined with the operative polyolefins to vary the physical properties of the molding material, such as stiffness. However, too much additive will cause the elongated part to break prematurely or to produce an irregular stretch.

The stretching of elongated part 26 need not occur immediately after the molding of device 20. It can be delayed, if desired. The pulling or stretching rate will vary with the particular thermoplastic material used to make a molded article, but as indicated hereinabove the rate must be slow enough to allow the material in the part being stretched to flow in adjusting from the thicker to the thinner cross-sectional size.

While the elongated part 26, after being fully stretched as indicated at 26", has been shown as being circular in cross-sectional shape, it may have had another shape such as oval. In the practice of the present invention, such cross-sectional shape may be as desired for the part to be stretched. When stretched the part will retain essentially the same but proportionally smaller cross-sectional shape after being stretched.

Before or after insertion into operative position in a uterus, the ball part 27 may be cut off, as desired. Usually, after such insertion the tail is cut off to the desired length.

FIGURES 9—10

The practice of the present invention is not confined to the production of intrauterine devices as shown at 20 in FIG. 1, but may also be utilized to produce the tag with integral tail shown in FIGS. 9 and 10 or the fishing lure with integral leader shown in FIGS. 11 and 12, as additional examples.

More specifically with reference to FIGS. 9 and 10, the numeral 30 represents a tag having a main flat body portion 31 from which extends an appendage portion 32 including a stretchable elongated part 33 integrally connected at one end to body portion 31 and at its other end to an integral head 34 shown specifically as an arrowhead. This construction of head enables it to be passed through a keyhole slot 35 in body portion 31 and thereafter turned so that the shoulders 34' and 34" of the arrowhead abut against one surface of this body portion on opposite sides of the narrow portion of this slot.

Part 33 can be stretched to a greater length and a reduced transverse size as indicated for this part 33' in FIG. 10. Part 33' will also have a substantially increased unit tensile strength or yield point. The stretching may be accomplished by placing a support (not shown but equivalent to support 28) against shoulders 31' and 31" on body portion 31 on opposite sides of appendage part 33 where attached to this body portion, and also placing a similar support (not shown but equivalent to support 29) against shoulders 34' and 34" on head part 34 on opposite sides of appendage part 33 where attached to this head part, and thereafter moving these supports apart at a rate to prevent breaking the appendage part.

FIGURES 11—12

In FIG. 11, the numeral 40, represents a fishing lure including a main body portion 41, of any desired configuration, specifically shown shaped generally as a minnow from the front end of which extends an appendage portion 42 including a stretchable elongated part 43 integrally connected at one end to body portion 41 and at its other end to an integral head 44 shown specifically as a ring or eye. Part 43 can be stretched to a greater length and reduced transverse size as indicated for this part 43' in FIG. 12. Part 43' will also have a substantially increased unit tensile strength or yield point. In a manner akin to that previously explained, stretching of appendage part 43 may be achieved by placing a support (not shown but equivalent to support 28) against shoulders 41' and 41" on body portion 41 on opposite sides of part 43 where attached to this body portion, and also placing a similar support (not shown but equivalent to support 29) against shoulders 44' and 44" on head part 44 on opposite sides of part 43 where attached to this head part, and thereafter moving these supports apart at a rate slow enough to avoid breaking part 43.

From the foregoing, it will be seen that the present invention provides a molded article having a relatively thin, long and stronger appendage part integrally connected to a main part. The specific devices given as examples are illustrative and not limitative of the present invention

I claim:

1. A method, comprising molding of a polyolefin material having a principally crystalline structure an article including a body portion and an appendage portion integral therewith which projects therefrom and has a smaller dimension in at least one transverse direction, said appendage portion having an elongated part one end of which is connected to said body portion and a head part connected to the other end of said elongated part, placing a support against said body portion adjacent its connection to said elongated part, placing another support against said head part adjacent its connection to said elongated part, and moving apart said supports only in the direction of the longitudinal extent of said elongated part to stretch only said elongated part into increased length and decreased cross-sectional area.

2. A method according to claim 1 wherein said supports are moved apart at a rate insufficient to break said elongated part.

3. A method according to claim 2 wherein said supports are moved apart until said elongated part has been reduced to a cross-sectional area substantially uniform throughout its increased length.

4. An article of manufacture made of a polyolefin material having a principally crystalline structure comprising a body portion and an elongated appendage portion integral with said body portion and projecting therefrom and having a smaller dimension in at least one transverse direction, the unit tensile strength or yield point of said appendage portion being greater than that of said body portion.

5. An article of manufacture according to claim 4 wherein said unit tensile strength or yield point of said appendage portion is at least about eight times that of said body portion.

6. An article of manufacture according to claim 4 wherein the article is an intrauterine device in which said body portion is a barlike body curved in a substantially flat plane in the shape of a large S continuing into a smaller S, and said integral appendage portion at one end extends from the free end portion of said smaller S.

7. A method of producing a one-piece article having portions of different dimensions and unit tensile strengths or yield points, which comprises the steps of molding a polyolefin material having a principally crystalline structure into the form of a body portion and an integral elongated appendage portion which projects from said body portion and has a smaller dimension in at least one transverse direction, and applying a stretching force only to said appendage portion only in the direction of its longitudinal extent to increase its length and decrease its cross-sectional area and also to increase its tensile strength or yield point over that of said body portion.

8. A method of producing an article as set forth in claim 7 wherein said stretching force is applied only until said appendage portion has been reduced to a substantially uniform cross sectional area throughout its length.